US008745008B2

(12) United States Patent
Kisin et al.

(10) Patent No.: US 8,745,008 B2
(45) Date of Patent: Jun. 3, 2014

(54) PROPAGATING PER-CUSTODIAN PRESERVATION AND COLLECTION REQUESTS BETWEEN EDISCOVERY MANAGEMENT APPLICATIONS AND CONTENT ARCHIVES

(75) Inventors: Roman Kisin, San Jose, CA (US); Andrey Pogodin, Sunnyvale, CA (US); Pierre Raynaud-Richard, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 13/604,821

(22) Filed: Sep. 6, 2012

(65) Prior Publication Data
US 2014/0067766 A1 Mar. 6, 2014

(51) Int. Cl.
*G06F 7/00* (2006.01)
*G06F 17/00* (2006.01)
*G06F 17/30* (2006.01)

(52) U.S. Cl.
USPC .................... 707/661; 707/667; 707/713

(58) Field of Classification Search
CPC .............................. G06F 17/30073
USPC .................. 707/667, 661, 662, 713
See application file for complete search history.

(56) References Cited

U.S. PATENT DOCUMENTS

| 8,572,227 | B2 * | 10/2013 | Toomey et al. ............... 709/223 |
| 2009/0164790 | A1 | 6/2009 | Pogodin |
| 2009/0165026 | A1 | 6/2009 | Paknad et al. |
| 2010/0250538 | A1 | 9/2010 | Richards et al. |
| 2011/0040600 | A1 | 2/2011 | Paknad et al. |
| 2011/0093471 | A1 * | 4/2011 | Brockway et al. ............ 707/747 |
| 2011/0106773 | A1 * | 5/2011 | Smith et al. ................... 707/694 |
| 2011/0131225 | A1 | 6/2011 | Mayer et al. |

OTHER PUBLICATIONS

Henseler, Dr. Hans, Network-based filtering for large email collections in E-Discovery, Artificial Intelligence and Law, Dec. 2010, pp. 413-430, vol. 18, Issue 4, Kluwer Academic Publishers, Hingham, United States.

Zhu, Wei-Dong et al., IBM Enterprise Content Management and IBM Information Archive: Providing the Complete Solution, International Technical Support Organization, Jan. 2011, pp. 1-100, International Business Machines Corporation, Armonk, United States.

Zhu, Wei-Dong et al., IBM Enterprise Content Management and IBM Information Archive: Providing the Complete Solution, International Technical Support Organization, Jan. 2011, pp. 101-158, International Business Machines Corporation, Armonk, United States.

* cited by examiner

*Primary Examiner* — Alex Gofman
*Assistant Examiner* — Merilyn Nguyen
(74) *Attorney, Agent, or Firm* — Patterson & Sheridan, LLP

(57) ABSTRACT

A method, computer program product, and system for defining custodianship of content in an electronic discovery management system, and maintaining custodianship definitions in an external content archive, the custodianship specifying at least one parameter of a first custodian to associate the content with the first custodian. Responsive to receiving a request to perform an operation on the content associated with the first custodian, the request is modified with the at least one parameter of the first custodian and at least one property of the content in the content archive, the at least one parameter and at the least one property being consumable by the content archive. The modified request is sent to the content archive, which is configured to, responsive to receiving the modified request, perform the operation on the content associated with the first custodian.

21 Claims, 5 Drawing Sheets

PROPAGATING PER-CUSTODIAN PRESERVATION AND COLLECTION REQUESTS BETWEEN EDISCOVERY MANAGEMENT APPLICATIONS AND CONTENT ARCHIVES

BACKGROUND

Disclosed herein are techniques to define custodianship of content in an electronic discovery management system and enforce the custodianship of the content in a content archive.

An electronic discovery management system (EMS) is generally used to manage all aspects of the electronic discovery (eDiscovery) process by providing a system to store and track information related to legal matters within an organization. For example, an EMS may, for many different legal matters, identify selection criteria for electronic documents subject to a hold in the legal matter, and identify custodians associated with the electronic documents (e.g. authors or recipients of an email). The EMS may then manage workflows surrounding the legal matters in order to preserve and collect evidence.

Custodianship may generally be defined as what content belongs to (or is associated with) which person. Attempts to define custodianship at the content archive result in complex and unusable solutions due to the fact that legal staff needs to interact with information technology (IT) staff in order to create a definition of custodianship inside a content archive before a collection plan can be executed. It may be impossible to predefine custodianship rules which fit all eDiscovery scenarios.

On the other extreme, attempts to fully delegate the management of per-custodian preservation requests to EMS applications or integration infrastructure external to the content archive leads to lack of custodian visibility inside review tools working on top of the content archive and lack in granularity in audit trail information (how many content items were put on hold for a particular custodian within a particular preservation plan). These tools may not know which data belongs to which custodian because this knowledge is owned by the EMS. Furthermore, this solution leads to unclear audit trails and unnecessary performance hits during hold or release stages in the content archive.

SUMMARY

Embodiments disclosed herein describe a computer-implemented method, computer program product, and system to define custodianship of content in an electronic discovery management system and maintain custodianship definitions at a content archive external to the electronic discovery management system by defining, in the electronic discovery management system, custodianship of content, the content being stored the content archive and the custodianship specifying at least one parameter of a first custodian to associate the content with the first custodian. The operation, responsive to receiving a request to perform an operation on the content associated with the first custodian, modifies the request, in the electronic discovery management system, with the at least one parameter of the first custodian and at least one property of the content in the content archive, the at least one parameter and at the least one property of the content in the content archive being consumable by the content archive. The operation then sends the modified request to the content archive, the content archive being configured to, responsive to receiving the modified request, perform the operation on the content associated with the first custodian.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

DETAILED DESCRIPTION

Figure 1:
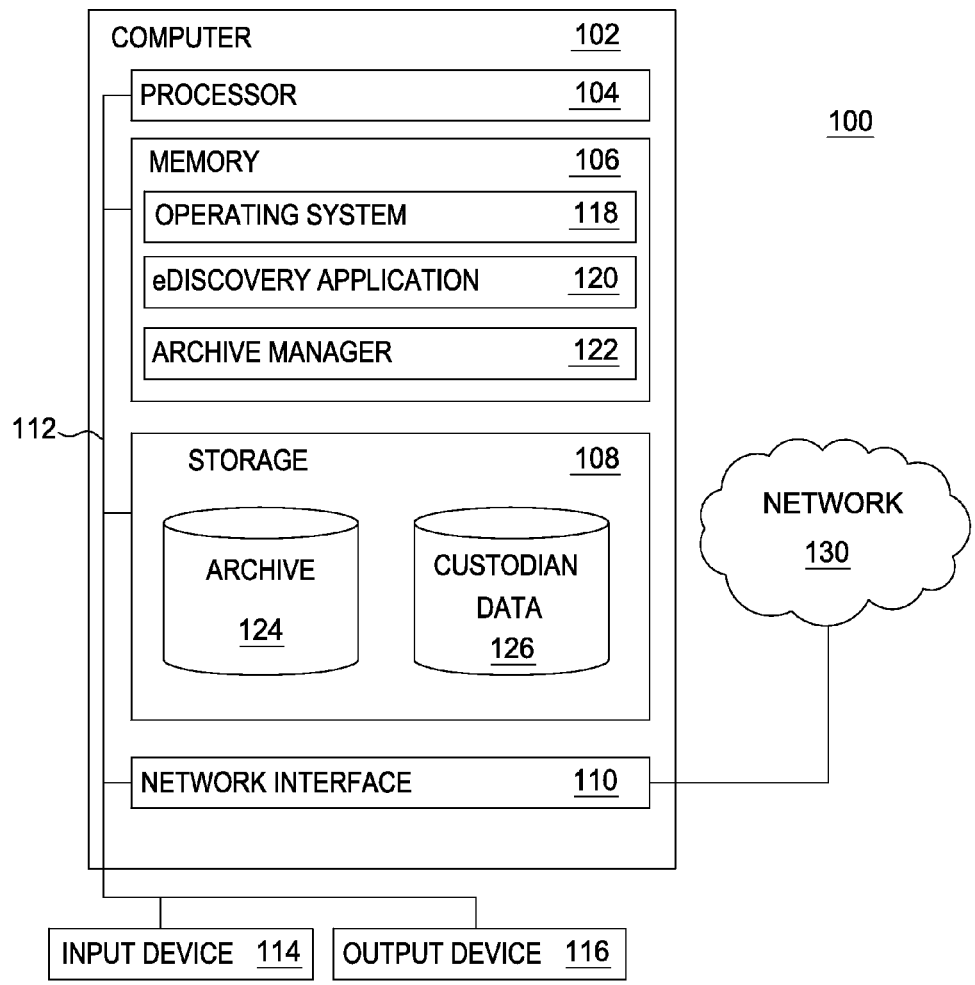
FIG. 1 is a block diagram illustrating a system for propagating per-custodian preservation and collection requests between electronic discovery management applications and content archives, according to one embodiment disclosed herein.

Embodiments disclosed herein propose a content archive application (hereinafter "content archive") designed to support per-custodian preservation requests and an electronic discovery (eDiscovery) management system (EMS) capable of using the content archive in an efficient manner through the new integration approach between these applications. In one embodiment, the EMS supplies the custodianship definition to the content archive in the form of search criteria. The content archive, which is generally external to the EMS, provides the data model containing the notion of a custodian, and is able to associate the search results of a multi-custodian search query with a custodian object in a single pass. By modeling the application architecture in this manner, the performance impact of a hold or a release request for a preservation plan containing a large number of custodians will be more efficient, and review and analysis tools can rely on a robust custodianship definition, and releasing content per custodian can be done in an efficient manner.

Typically, eDiscovery practices do not rely on a universal definition of custodianship, but rather define custodianship on a case-by-case basis. For example:

Case A requires preservation of all files archived from John Smith's desktop into a content archive.

Case B requires preservation of all files archived from a marketing file share to a content archive which have been updated by John Smith.

Case C requires preservation of all email to or from John Smith.

Case D requires preservation of all files from John Smith's home folder on a departmental file share.

In all cases, the custodian is the same—John Smith. Content archives must provide a certain level of support for custodianship (i.e., handle operations for multiple custodians efficiently) in order to be considered eDiscovery-capable. This is needed for the ability to: (i) efficiently put on hold and release from hold all content belonging to a given custodian within a multi-custodian preservation plan (where, in some cases, custodians may be released one-by-one); (ii) communicate audit trail information per custodian (such as, how many files were put on hold for a given custodian within a preservation plan), such that legal department members are aware of these actions; (iii) group and search files per custodian in review tools sitting on top of archives; and (iv) efficiently handle situations where content belongs to multiple custodians within the same preservation plan, where the content may be released only if there are no more custodians to whom the content belongs listed in the preservation plan. A preservation plan is a task that executes a hold (and later, a release) against a particular system containing query parameters and a list of custodians.

In order to meet these requirements, embodiments disclosed herein define custodianship in the EMS, which is passed to the content archive (in some embodiments, through an API of the content archive). The content archive is designed to have a notion of a custodian, which, in some embodiments, is a database object, a folder, or a tag containing custodian information or pointing to an object containing such information, but the content archive does not manage the definition of a custodian, as the definition of a custodian is managed by the EMS. The content archive performs per-custodian preservation using the custodian definitions provided by the EMS for each preservation plan. While processing results, the content archive creates custodian objects for each custodian and associates the content with them. If the content belongs to more than one custodian, it is associated with more than one custodian object. By designing the application architecture in such a manner, analysis and review tools can rely on explicit custodian objects when grouping and filtering the content. Additionally, it is easy to release content belonging to a particular custodian, by deleting the folder and all associations; if the content is not associated with any other custodians within a given preservation plan, it will be released from the preservation plan. In sum, the EMS is responsible for defining custodianship, and the content archive is responsible for enforcing custodianship. The content archive's hold execution capability is designed so that it can aggregate multiple custodian search parameters into a single query, and then efficiently process the results associating content items it found with proper custodians.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications such as an eDiscovery application or related data available in the cloud. For example, the eDiscovery application could execute on a computing system in the cloud and receive a request to create a multi-custodian preservation plan. In such a case, the eDiscovery application could define the custodianship and store data related to the preservation plan at a storage location in the cloud. Doing so allows a user to access this information from any computing system attached to a network connected to the cloud (e.g., the Internet).

FIG. 1 is a block diagram illustrating a system 100 for propagating per-custodian preservation and collection requests between electronic discovery management applications and content archives, according to one embodiment disclosed herein. The system 100 includes a computer 102. The computer 102 may be connected to other computers via a network 130. In general, the network 130 may be a telecommunications network and/or a wide area network (WAN). In a particular embodiment, the network 130 is the Internet.

The computer 102 generally includes a processor 104 connected via a bus 112 to a memory 106, a network interface device 110, a storage 108, an input device 114, and an output device 116. The computer 102 is generally under the control of any suitable commercially available or open source operating system 118, supporting the functions disclosed herein. The processor 104 is included to be representative of a single CPU, multiple CPUs, a single CPU having multiple processing cores, and the like. Similarly, the memory 106 may be a random access memory. While the memory 106 is shown as a single entity, it should be understood that the memory 106 may comprise a plurality of modules, and that the memory 106 may exist at multiple levels, from high speed registers and caches to lower speed but larger DRAM chips. The network interface device 110 may be any type of network communications device allowing the computer 102 to communicate with other computers via the network 130.

The storage 108 may be a hard disk drive storage device. Although the storage 108 is shown as a single unit, the storage 108 may be a combination of fixed and/or removable storage devices, such as fixed disc drives, removable memory cards, optical storage, flash memory or solid state storage devices (SSD). The memory 106 and the storage 108 may be part of one virtual address space spanning multiple primary and secondary storage devices.

The input device 114 may be any device for providing input to the computer 102. For example, a keyboard, keypad, light pen, touch-screen, track-ball, or speech recognition unit, audio/video player, and the like may be used. The output device 116 may be any device for providing output to a user of the computer 102. For example, the output device 116 may be any conventional display screen or set of speakers, along with their respective interface cards, i.e., video cards and sound cards. Although shown separately from the input device 114, the output device 116 and input device 114 may be combined. For example, a display screen with an integrated touch-screen, a display with an integrated keyboard, or a speech recognition unit combined with a text speech converter may be used.

As shown, the memory 106 contains eDiscovery application 120. The eDiscovery application 120 may be used to manage all aspects of the eDiscovery process. The eDiscovery application 120 may provide a method to store and track information related to legal matters within an organization. The eDiscovery application 120 may also define workflows for each of the processes within a legal matter, provides mechanisms to issue notices and alerts related to steps in the workflow, and methods to track progress of items within the workflow. Further, the eDiscovery application 120 may define custodianship of content located in a content archive 124. In some embodiments, the eDiscovery application 120 stores the custodianship information in the custodian data 126. One example of an eDiscovery management application is IBM® Atlas eDiscovery Process Management. (IBM is a trademark of International Business Machines Corporation, registered in many jurisdictions worldwide.)

As shown, the memory 106 also contains archive application 122. The archive application 122 is generally configured to provide tools to access and manage a content archive, for example, the content archive 124. The archive application 122 may contain a content management layer, a search engine, a content index, and at least one application programming interface (API). The archive application may also contain and manage data structures related to legal matters and custodians for storage in the content archive 124. For example, the archive application 122 may receive a request from the eDiscovery application 120 in the form of a query, and perform an operation on the content in the content archive 124.

The archive application 122 may associate content in the content archive 124 with a custodian object in the content archive 124, whereby the content is subject to a preservation plan and not deleted or modified until a request to release the content from the preservation plan is communicated by the eDiscovery application 120 to the archive application 122. The archive application 122 may also be configured to return information on the content stored in the content archive 124 responsive to a request received from the eDiscovery application 120. One example of an archive application is IBM Smart Archive.

As shown, the storage 108 contains the content archive 124. The content archive 124 is a storage unit for the long-term retention of data. Although the content archive 124 is pictured as a relational database, the content archive 124 may take any form suitable to archive data. The content archive 124 may be configured to store any type of data, including, but not limited to, emails, files, and instant messaging logs. As shown, the storage 108 also contains the custodian data 126. The custodian data 126 is a repository used to store custodianship associations. Although the custodian data 126 is pictured as a relational database, it may take any form suitable to store data, including, but not limited other database formats, content metadata within content management platforms, or flat files. The custodian data 126 may associate any information related to a person in the custodian record, including, but not limited to, name, unique identifiers, and other personal attributes. In some embodiments, the custodian data 126 is part of a larger database managed by the eDiscovery application 120.

Although depicted as residing on the computer 102, the eDiscovery application 120, the archive application 122, the content archive 124, and the custodian data 126 may reside on different computers, different memories and storage units within the same computer, or any combination thereof. Furthermore, some features may be managed by both the archive application 122 or the eDiscovery application 120, and the data used and generated by these applications may be stored in different locations, such as the content archive 124 and the custodian data 126. For example, a query may be generated by the eDiscovery application 120, or it may be generated by the archive application 122. However, the eDiscovery application 120 always manages the definition of custodianship and the content archive 124 enforces the definition of custodianship as well as stores the custodianship associations.

Figure 2:
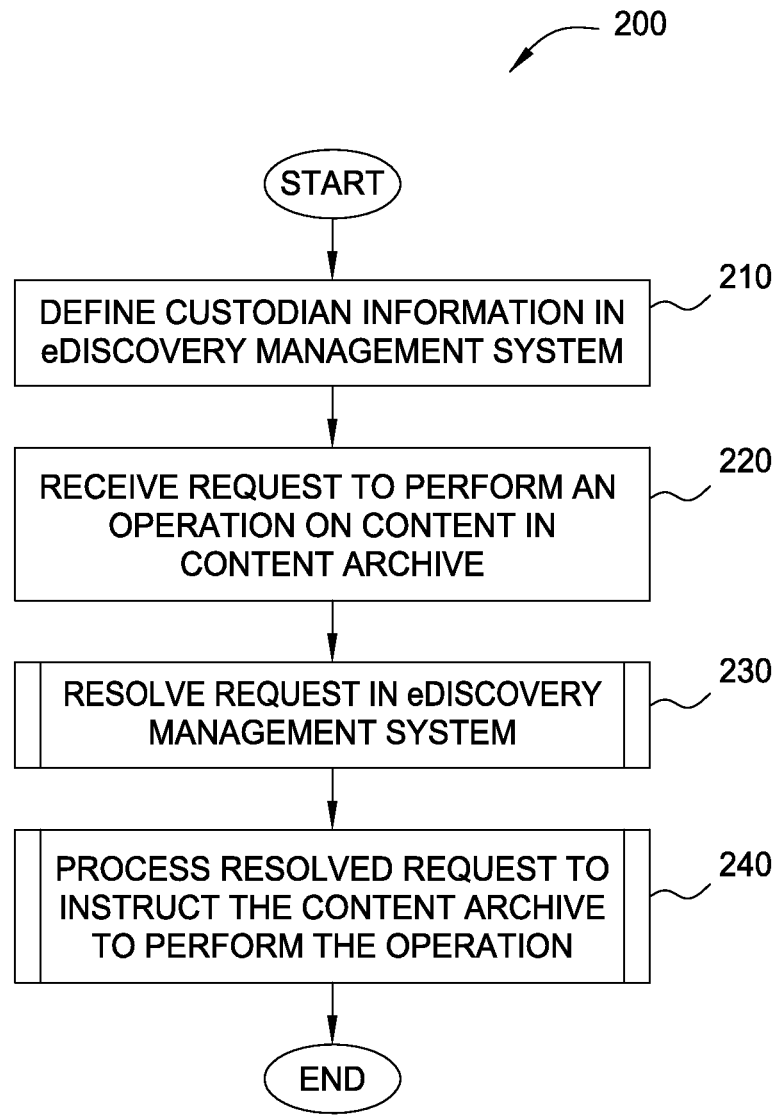
FIG. 2 is a flow chart illustrating a method for propagating per-custodian preservation and collection requests between electronic discovery management applications and content archives, according to one embodiment disclosed herein.

FIG. 2 is a flow chart illustrating a method 200 for propagating per-custodian preservation and collection requests between electronic discovery management applications and content archives, according to one embodiment disclosed herein. Generally, the method 200 provides the framework for defining custodianship in the eDiscovery application 120, such that when a request is received to perform an operation on content in the content archive 124, the eDiscovery application 120 provides the necessary parameters to the content archive 124 necessary to execute the operation. The method 200 begins at step 210, where the eDiscovery application 120 defines custodianship information. In some embodiments, the eDiscovery application 120 stores the custodianship information in the custodian data 126. In some embodiments, user input may be required to enter the data which defines custodianship (for example, "home folder" information can be populated for each custodian manually as a result of an interview) in the custodian data 126. For example, a user may specify an employee, Joseph Amino, whose custodianship information needs to be populated in the custodian data 126. The user may specify data, including, but not limited to, a first name, last name, personal folder location, and employee identification number. In other embodiments, the eDiscovery application 120 may retrieve some of this information from the person records in its data stores, and assign unique identifiers as necessary, populating all items into the custodian record in the custodian data 126. Thus, Joseph Amino's record in the custodian data 126 may include his first and last name, his employee identification number EMP123, personal folder location \\filer1\eng\jamino, and a custodian ID (auto-generated by the eDiscovery application 120) with a value of 10023.

At step 220, the eDiscovery application 120 receives a request from a user to perform an operation on content in the content archive 124. The request may be to create a preservation plan, release content for one or more custodians from a preservation plan, or perform a search on the content managed by the content archive. The operation could be, for example, to create a preservation plan containing custodians Joseph Amino and another employee, Pat Rose, putting all of their data meeting the request criteria on hold. Placing content on "hold" indicates that the content will not be deleted or altered while the content is subject to the hold. The request may specify a plurality of properties of the content, including, but not limited to, a content type, a date range of the content, keywords, and location of the content. For example, the request could specify selection criteria to select content of type email sent or received by the custodians, i.e., Joseph Amino and Pat Rose, which were generated between Jan. 1, 2001 and Jan. 1, 2003. Alternatively, the request may specify any email which the custodians have viewed, were copied (cc) on, or blind copied (bcc) on. Any possible combination of criteria may be used, and any examples used herein should not be considered limiting of the disclosure. At step 230, discussed in further detail with reference to FIG. 3, the request is resolved in the eDiscovery management system. In some embodiments, the eDiscovery application 120 performs the functionality of step 230 by resolving the request into archive application 122 API calls. For example, eDiscovery application 120 may need to retrieve and resolve dynamic variables from the custodian data 126 in order to prepare data for an API call to the archive application 122. Once the request has been resolved, at step 240 the eDiscovery application 120 sends the request to the archive application 122 in a format consumable by the archive application 122 to instruct the archive application 122 to perform the requested operation. For example, the archive application 122 and the eDiscovery application 120 may not have consistent variable, table, and column names, which need to be reconciled so that the two applications may communicate. At step 240, described in further detail with reference to FIG. 4, the archive application 122 performs the requested operation.

Figure 3:
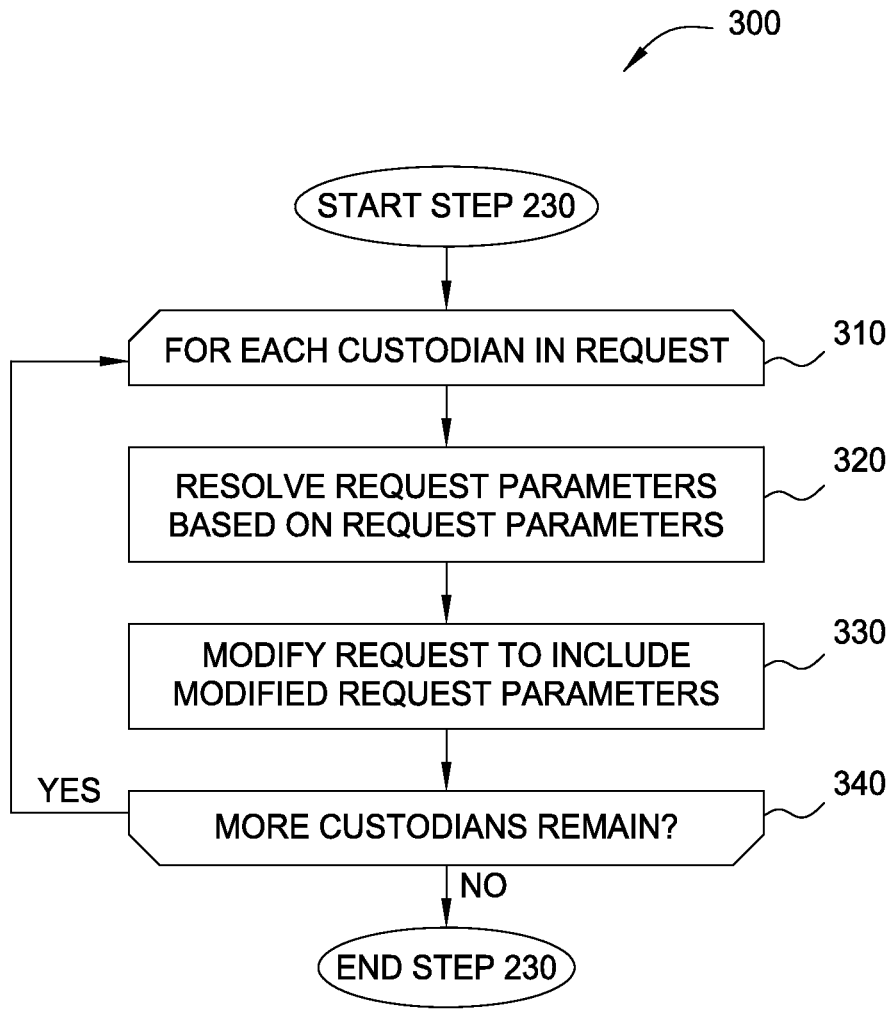
FIG. 3 is a flow chart illustrating a method for resolving a request in an electronic discovery management system, according to one embodiment disclosed herein.

FIG. 3 is a flow chart illustrating a method 300 corresponding to step 230 for resolving a request in an electronic discovery management system, according to one embodiment disclosed herein. In some embodiments, the steps of the method 300 are performed by the eDiscovery application 120. It may be necessary to translate the request, such that the request is received in a format consumable by the archive application 122. At step 310, the eDiscovery application begins executing a loop containing steps 320-340 for each custodian specified in the request. Generally, the request may only contain limited information regarding the person/custodian subject to the request. For example, the request may only include the custodian's first name, last name, and a date range. The request parameters may read as follows:

Start Date: Jan. 1, 2001
End Date: Jan. 1, 2003
Personal Folder: <to be populated with contents of corresponding field from Person table>
First Name: Joseph
Last Name: Amino
Employee ID: <to be populated with contents of corresponding field from Person table>
Custodian ID: <to be populated with a unique custodian ID>

The employee ID and custodian ID fields are parameters used to uniquely identify a person in the eDiscovery application and by the archive application 122, respectively. At step 320, the eDiscovery application 120 will resolve request values based on the request parameters. For example, if the request specifies Joseph Amino, the eDiscovery application 120 will query a person table in the custodian data 126 to retrieve the parameters associated with his record. The eDiscovery application 120 may therefore retrieve Joseph Amino's first and last name, employee identification number, personal folder location, and custodian ID. At step 330, the eDiscovery application 120 resolves the request to include the resolved request parameters, which may now appear as:

Start Date: Jan. 1, 2001
End Date: Jan. 1, 2003
Personal Folder: \\filer1\eng\jamino
First Name: Joseph
Last Name: Amino
Employee ID: EMP123
Custodian ID: 10023

By operating in such a manner, the eDiscovery application 120, as manager of custodianship definitions, may provide custodianship data compatible with both the eDiscovery application 120 as well as the archive application 122. At step 340, the eDiscovery application 120 determines whether the request specifies additional custodians. If the request specifies additional custodians, the eDiscovery application 120 returns to step 310. In the example given above, the original request specifies Pat Rose, so the method 300 would be executed again for the custodian Pat Rose. Otherwise, the method 300 ends.

Figure 4:
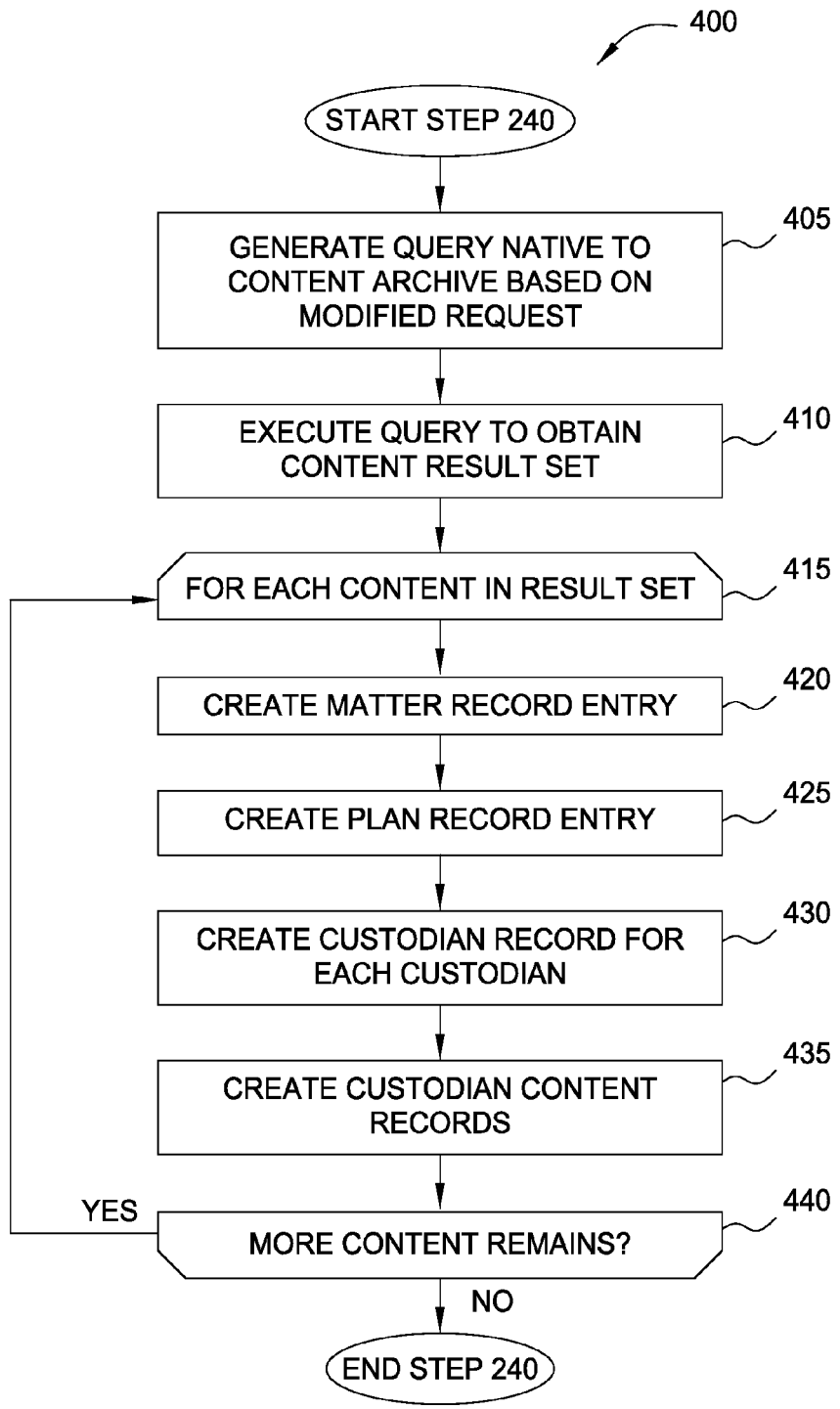
FIG. 4 is a flow chart illustrating a method for processing a resolved request to instruct a content archive to perform a hold operation, according to one embodiment disclosed herein.

FIG. 4 is a flow chart illustrating a method 400 corresponding to step 240 for processing a resolved request to instruct a content archive to perform a hold operation, according to one embodiment disclosed herein. In some embodiments, the steps of the method 400 are performed by the archive application 122. In one embodiment, the content archive 124 is a relational database containing matter, preservation plan, and custodian tables. The matter table may contain matter ID and matter name fields. The preservation plan table may contain a plan ID, plan name, and matter ID fields, where matter ID is a foreign key pointing to the same field in the matter table. The custodian table may contain a custodian ID, custodian first name, custodian last name, employee ID, custodian external ID (an identifier passed from the eDiscovery application 120 as "Custodian ID"), and plan ID (foreign key to the plan table). If there is a need to understand which custodian record belongs to which matter, foreign keys must be traversed from the custodian table to the plan table to the matter table. Finally, there may be a table of content associations named CustodianContent, which contains custodian ID and content ID foreign keys. At step 405, the archive application 122 generates a query native to the archive application 122 based on the information inside the request received from the eDiscovery application 120. In some embodiments, the query may be encapsulated within an API call specific to a function within the archive application 122. In one embodiment, the query for placing custodians Joseph Amino and Pat Rose under a preservation plan may be written as:

select
10023 as custodianID,
'Joseph' as custFirstName,
'Amino' as custLastName,
'EMP123' as empID,
contentID
where
folder belongs to '\\filer1\eng\jamino'
and createdDate>='Jan. 1, 2001'
and createdDate<='Jan. 1, 2003'
union
select
10024 as folderID,
'Pat' as custFirstName,
'Rose' as custLastName,
'EMP234' as empID,
contentID
where
folder belongs to '\\filer1\eng\prose'
and createdDate>='Jan. 1, 2001'
and createdDate<='Jan. 1, 2003'

At step 410, the archive application 122 executes the generated query against the content archive 124 to obtain a content result set. The result set will include pointers to content from the content archive 124 which meets the query criteria. At step 415, the archive application 122 executes a loop containing steps 420-440 for each content in the result set. At step 420, the archive application 122 creates a matter record entry which may comprise creating an entry in the matter table. At step 425, the archive application 122 creates a plan record entry, which may comprise creating a record in the plan table. At step 430, the archive application 122 creates a custodian record for each custodian specified in the result set in the content archive 124, which may include updating the custodian table with an entry for each custodian. In some embodiments, this step further comprises creating a folder in the content archive 124 and appending metadata to the folder, including, but not limited to, the custodian first name, last name, and employee ID to facilitate analysis and review, and make a user interface more readable. At step 435, the archive application 122 associates the content with the custodian object by creating custodian content records by adding the custodian ID and the content ID to the CustodianContent table. By creating these associations, the archive application 122 may specify that the content is on hold, and shall not be deleted. It is of note that the same content may be associated with multiple custodians. At step 440, the archive application 122 determines whether more content remains in the result set. If more content remains, the archive application 122 returns to step 415. Otherwise, the method 400 ends. Although the embodiment depicted in FIG. 4 executes each of the steps in the loop 415-440, in some embodiments, each of the steps may not be executed if corresponding records exist in the database tables. The archive application 122 may contain logic to determine whether such records exist. For example, the archive application 122 may determine whether a custodian record already exists for Joseph Amino before creating a custodian record for Joseph Amino in the custodian table. Therefore, if a record for Joseph Amino already exists in the custodian table of the content archive 124 (for example, he is already under Preservation Plan A), when a request is received to place Joseph Amino under a new Preservation Plan B, the archive application 122 may create the Preservation Plan B record in the preservation plan table, not create a new record for Joseph Amino in the custodian table, and create the appropriate custodian content entries in the CustodianContent table.

Once a hold operation is completed as described herein, the archive application 122 has enough information to decide which content should not be deleted as part of a normal retention/disposition cycle. As an example, suppose a timer task wants to determine what content should not be disposed of. The task may query the CustodianContent table to select distinct contentIDs. All items with contentIDs retrieved by this query belong to a preservation plan, so they should not be subject to a standard retention/disposition.

Figure 5:
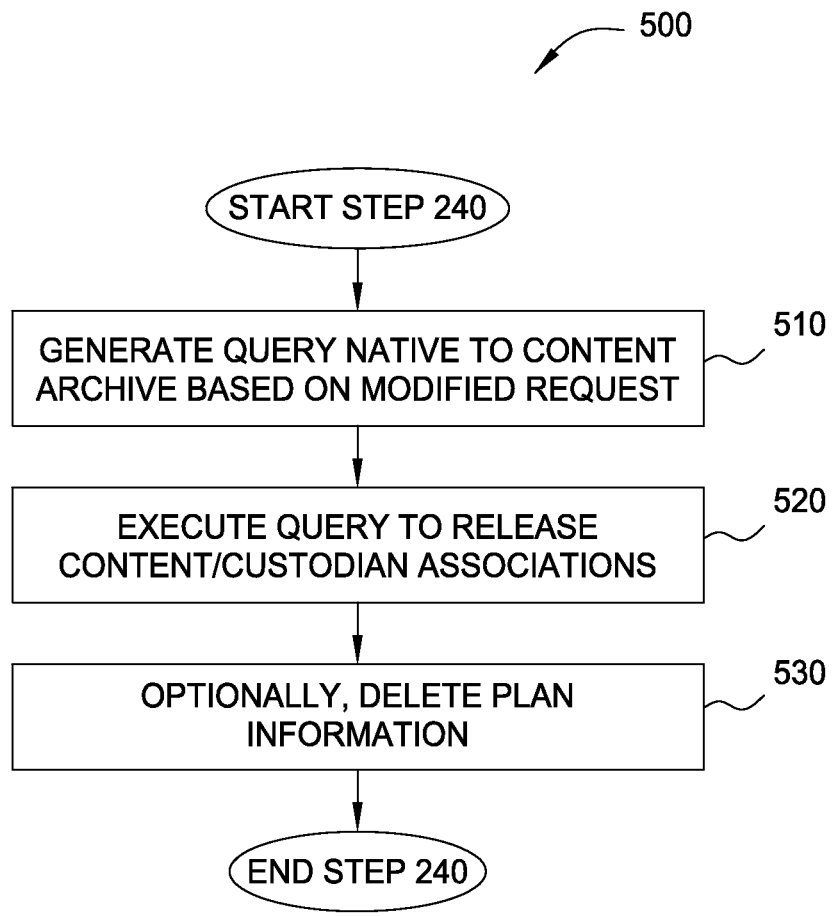
FIG. 5 is a flow chart illustrating a method for releasing content from a preservation plan, according to one embodiment disclosed herein.

FIG. 5 is a flow chart illustrating a method 500 corresponding to step 240 for releasing content from a preservation plan, according to one embodiment disclosed herein. A release specifies that the content associated with the identified custodian should be released from the preservation plan (i.e. no longer on hold). Due to the way the method 400 creates holds, a search is not required to find content associated with a particular custodian or plan. The eDiscovery application 120 may specify a plan ID (and in some embodiments, a list of custodians to be released), and the archive application 122 may delete these records from the content archive 124. In some embodiments, the archive application 122 executes the steps of the method 500. When a release is requested, the modified request supplied by the eDiscovery application 120 may indicate whether the entire plan is to be released, custodian IDs for each custodian if the entire plan is not to be released, and a plan ID. At step 510, the archive application 122 generates a query native to the content archive 124 based on the modified request received from the eDiscovery application 120. If the entire plan is to be released, the query will include commands to delete all CustodianContent containing all custodians whose custodian IDs are associated with the plan ID. If the entire plan is not to be deleted, a query will be generated to include commands to delete CustodianContent records including the listed custodians whose custodian IDs are associated with the supplied plan ID. At step 520, the archive application 122 executes the query to release the custodian/content associations based on the parameters generated at step 510. If the entire plan was not specified to be released, upon deleting all of the CustodianContent records, the archive application 122 may determine whether to delete the custodian information. Once the associations between content and custodian are deleted, the archive application deletes the records for custodians, which need to be released from the plan. In the case of a full release, all the custodian records are deleted. If no more CustodianContent records are pointing to a particular content item, it becomes a subject to normal retention/disposition. At step 530, the archive application 122 deletes the plan information if the entire plan was specified to be released. This may include deleting the folder (or database object) representing the plan, and deleting the plan from the preservation plan table. Upon executing the queries to delete the CustodianContent, custodian, and preservation plan information, the method 500 ends.

Advantageously, the archive application 122 now has a notion of custodianship. The content in the content archive 124 is tagged by custodian, and indirectly by a preservation plan. As a result, operations which require filtering content by custodianship are easy to execute. The operations may include retrieving all content associated with a custodian, retrieving content counts per custodian, retrieving all content under a preservation plan, and retrieving content totals per preservation plan. Even a search within content belonging to a custodian may become simpler, as the archive application 122 can first filter the subset of the content belonging to a particular custodian, then perform a search based on a smaller subset of data. For example, a user may request the number of files on hold for every custodian. The archive application 122 can define an API "CustodianTotal[ ] getTotalsForPlan (planId)". The input is plan ID, the output is an array of CustodianTotal objects, each object containing custodianID and total number of documents per custodian. On implementation side, the archive application 122 finds all custodian objects for a plan and count the number of content associations for each object. Additionally, the API can have a method "int getTotalForPlanAndCustodian(planId, custodianId)" which counts only one total for a single custodian.

The application architecture disclosed herein places responsibility for defining custodianship with an eDiscovery management system, but the eDiscovery management system does not manage custodians directly in the content archive. The content archive has a capability to manage custodians efficiently (per-custodian support), but does not manage the definition of custodians. The architecture disclosed herein results in significant performance gains, increased process transparency, simplicity of design, and improves the quality of content analysis and review.

Embodiments disclosed herein allow for simple and robust integrated solutions in the eDiscovery area, making other integration attempts obsolete, saving maintenance and installation costs. Embodiments disclosed herein may significantly increase the transparency of eDiscovery requests, resulting in less likelihood of errors, thus reducing an entity's legal risks. By defining the application architecture as disclosed herein, there may be a significantly smaller performance hit on email and file archives when performing large eDiscovery requests. Finally, embodiments disclosed herein provide better capabilities for analysis and review tools deployed on top of archives, due to explicit custodianship relationships existing in the content archive.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method to define custodianship of content in an electronic discovery management system and maintain custodianship definitions at a content archive external to the electronic discovery management system, comprising:

defining, in the electronic discovery management system, custodianship of content, wherein the content is stored in the content archive, wherein the custodianship specifies at least one parameter associating the content with a first custodian; and responsive to receiving a request to create a preservation plan for the content associated with the first custodian:

modifying the request, in the electronic discovery management system and by operation of one or more computer processors, with the at least one parameter of the first custodian and at least one property of the content in the content archive; and responsive to receiving the modified request at the content archive:

generating a query native to the content archive based on the modified request;

executing the generated query at the content archive to obtain a result set comprising at least one content;

upon determining, based on at least one of the result set and the modified request, that the content archive does not include an object representing the first custodian, creating, in the content archive, a custodian object representing the first custodian;

associating the first custodian with the preservation plan; and placing the identified content on hold by associating the at least one content with the custodian object representing the first custodian.

2. The method of claim 1, wherein the at least one parameter and the at least one property of the content in the content archive are consumable by the content archive, wherein the at least one parameter of the first custodian and the at least one property of the content are retrieved from the electronic discovery management system.

3. The method of claim 2, further comprising:

responsive to receiving a request to release the preservation plan:

deleting the associations between the custodian objects and the identified content; and deleting a preservation plan object.

4. The method of claim 2, further comprising:

responsive to receiving a request to release the content of the first custodian from the preservation plan, deleting the associations between the first custodian and the at least one content.

5. The method of claim 4, wherein the custodianship specifies a plurality of custodians including the first custodian and a second custodian, wherein the content is further associated with the second custodian, wherein the request further specifies to release the content associated with the first custodian and the second custodian, wherein the request is modified with one or more parameters of the second custodian, the method further comprising deleting the associations between the second custodian and the at least one content.

6. The method of claim 5, wherein the content stored in the content archive is one of instant messaging logs, data files, and email, wherein the at least one property of the content comprises at least one of: (i) a content type, (ii) a content date, and (iii) a content location, wherein the at least one parameter of the first custodian comprises a unique identifier of the first custodian, wherein the one or more identifiers and the at least one property of the content in the content archive are not specific to the electronic discovery management system.

7. The method of claim 1, wherein the at least one parameter associating the content with a first custodian is specified by, in respective instances, each of: (i) user input, and (ii) programmatically retrieving, by the electronic discovery management system, the at least one parameter from one or more data stores.

8. A computer program product to define custodianship of content in an electronic discovery management system and maintain custodianship definitions at a content archive external to the electronic discovery management system, comprising:

a non-transitory computer-readable storage medium having computer-readable program code embodied therewith, the computer-readable program code comprising:

computer-readable program code configured to define, in the electronic discovery management system, custodianship of content, wherein the content is stored in the content archive, wherein the custodianship specifies at least one parameter associating the content with a first custodian; and computer-readable program code configured to, responsive to receiving a request to create a preservation plan for the content associated with the first custodian:

modify the request, in the electronic discovery management system, with the at least one parameter of the first custodian and at least one property of the content in the content archive; and responsive to receiving the modified request at the content archive:

generate a query native to the content archive based on the modified request;

execute the generated query at the content archive to obtain a result set comprising at least one content;

upon determining, based on at least one of the result set and the modified request, that the content archive does not include an object representing the first custodian, create, in the content archive, a custodian object representing the first custodian;

associate the first custodian with the preservation plan; and place the identified content on hold by associating the at least one content with the custodian object representing the first custodian.

9. The computer program product of claim 8, wherein the at least one parameter and the at least one property of the content in the content archive are consumable by the content archive, wherein the at least one parameter of the first custodian and the at least one property of the content are retrieved from the electronic discovery management system.

10. The computer program product of claim 9, further comprising:

responsive to receiving a request to release the preservation plan:

deleting the associations between the custodian objects and the identified content; and deleting a preservation plan object.

11. The computer program product of claim 10, further comprising:

responsive to receiving a request to release the content of the first custodian from the preservation plan, deleting the associations between the first custodian and the at least one content.

12. The computer program product of claim 11, wherein the custodianship specifies a plurality of custodians including the first custodian and a second custodian, wherein the content is further associated with the second custodian, wherein the request further specifies to release the content associated with the first custodian and the second custodian, wherein the request is modified with one or more parameters of the second custodian, the computer-readable program code further comprising:

computer-readable program code configured to delete the associations between the second custodian and the at least one content.

13. The computer program product of claim 12, wherein the content stored in the content archive is one of instant messaging logs, data files, and email, wherein the one or more identifiers and the location of the content in the content archive are not specific to the electronic discovery management system, wherein the at least one property of the content comprises at least one of: (i) a content type, (ii) a content date, and (iii) a content location, wherein the at least one parameter of the first custodian comprises a unique identifier of the first custodian, wherein the one or more identifiers and the at least one property of the content in the content archive are not specific to the electronic discovery management system.

14. The computer program product of claim 8, wherein the at least one parameter associating the content with a first custodian is specified by, in respective instances, each of: (i) user input, and (ii) programmatically retrieving, by the electronic discovery management system, the at least one parameter from one or more data stores.

15. A system, comprising:
one or more computer processors; and
a memory containing a program, which when executed by the one or more computer processors performs an operation to define custodianship of content in an electronic discovery management system and maintain custodianship definitions at a content archive external to the electronic discovery management system, the first operation comprising:
   defining, in the electronic discovery management system, custodianship of content, wherein the content is stored in the content archive, wherein the custodianship specifies at least one parameter associating the content with a first custodian; and
   responsive to receiving a request to create a preservation plan for the content associated with the first custodian:
      modifying the request, in the electronic discovery management system, with the at least one parameter of the first custodian and at least one property of the content in the content archive; and
      responsive to receiving the modified request at the content archive:
         generating a query native to the content archive based on the modified request:
         executing the generated query at the content archive to obtain a result set comprising at least one content;
         upon determining, based on at least one of the result set and the modified request, that the content archive does not include an object representing the first custodian, creating, in the content archive, a custodian object representing the first custodian;
         associating the first custodian with the preservation plan; and
         placing the identified content on hold by associating the at least one content with the custodian object representing the first custodian.

16. The system of claim 15, wherein the at least one parameter and at the least one property of the content in the content archive are consumable by the content archive, wherein the at least one parameter of the first custodian and the at least one property of the content are retrieved from the electronic discovery management system.

17. The system of claim 16, the operation further comprising:
   responsive to receiving a request to release the preservation plan:
      deleting the associations between the custodian objects and the identified content; and
      deleting a preservation plan object.

18. The system of claim 16, the operation further comprising:
   responsive to receiving a request to release the content of the first custodian from the preservation plan, deleting the associations between the first custodian and the at least one content.

19. The system of claim 18, wherein the custodianship specifies a plurality of custodians including the first custodian and a second custodian, wherein the content is further associated with the second custodian, wherein the request further specifies to release the content associated with the first custodian and the second custodian, wherein the request is modified with one or more parameters of the second custodian, the method further comprising deleting the associations between the second custodian and the at least one content.

20. The system of claim 19, wherein the content stored in the content archive is one of instant messaging logs, data files, and email, wherein the at least one property of the content comprises at least one of: (i) a content type, (ii) a content date, and (iii) a content location, wherein the at least one parameter of the first custodian comprises a unique identifier of the custodian, wherein the one or more identifiers and the at least one property of the content in the content archive are not specific to the electronic discovery management system.

21. The system of claim 15, wherein the at least one parameter associating the content with a first custodian is specified by, in respective instances, each of: (i) user input, and (ii) programmatically retrieving, by the electronic discovery management system, the at least one parameter from one or more data stores.

* * * * *